Patented Nov. 26, 1929

1,737,101

UNITED STATES PATENT OFFICE

GROVER D. TURNBOW, OF DAVIS, CALIFORNIA, ASSIGNOR OF ONE-HALF TO CHESTER EARL GRAY, OF OAKLAND, CALIFORNIA

FROZEN FOOD PRODUCT AND METHOD OF MAKING SAME

No Drawing.    Application filed June 22, 1926. Serial No. 117,859.

This invention relates to frozen food products containing milk-solids-not-fat, especially, though not necessarily exclusively, ice cream, and to an improved method or process for the preparation of such products.

In the preparation of frozen food products, particularly ice cream, it has been the desire of manufacturers to produce a product having relatively high percentages of milk-solids-not-fat, on account of beneficial results derived from the milk proteins (casein and albumen). The inclusion in the product of this relatively high percentage of milk-solids-not-fat, is of primary importance, while the quantity of milk salts and lactose (milk sugar) is of more or less secondary importance, although, from a nutritional standpoint all of the constituents of the milk-solids-not-fat are most beneficial. Nevertheless, the lactose not being an essential ingredient, so far as the nutritional value of the product is concerned, the same may be omitted or changed without materially affecting the quality of the cream from a nutritional standpoint.

Heretofore it has not been possible to secure the desired percentage of milk proteins in ice cream without detrimental effects on the latter because of the fact that when such proteins, together with the other constituents of normal milk-solids-not-fat, are added to the mixture the lactose inherently present will be brought to a percentage whereby its relation to the water contained in the mixture will produce supersaturation at the temperature of the frozen product with the result that crystallization of the excess lactose or milk sugar will take place, thereby giving a very rough or "sandy" consistency to the product which is an exceedingly objectionable characteristic. In the trade this condition is usually referred to as "sandy" and is a matter of such moment that the literature of the ice cream-making industry will be found to contain numerous papers on the subject, many of such papers being reports of extensive research work done in an attempt to overcome this condition. As a result of such research work some investigators have concluded that the only procedure to be followed, if ice cream of smooth consistency is to be obtained, is to keep the volume or quantity of milk-solids-not-fat, at a point low enough with relation to the volume or quantity of the entire mixture so that lactose normally contained in the given quantity of milk-solids-not-fat, will not be such as to exceed the saturation point in the final frozen mixture. This elimination or curtailment of the milk-solids-not-fat, to be used, results in the percentage of milk proteins from the final product being also limited and to obtain the desired smooth consistency in the final product, ice cream manufacturers have resorted to the use of gelatine. However, this use of gelatine has, in turn, resulted in the increased cost of the production of the cream on account of the price of gelatine. Furthermore, where gelatine has been used unfavorable results have followed in many cases due to the fact that the gelatine sometimes carries undesirable bacteria and its quality almost constantly varies.

With the foregoing in mind, the present invention seeks to provide a new and improved product, particularly ice cream, that is very superior from a standpoint of texture, palatability and stability, a further object being to provide a method for the production of such product.

More specifically, the present invention seeks to increase the percentages of proteins (casein, etc.) in the final frozen product while, at the same time, preventing the formation of particles of crystallized lactose or milk sugar such as would cause the final product to be of "sandy" consistency. In other words, it is desirable that while the final product possesses high percentages of proteins it would also be of the desirable smooth consistency. To produce such a product the casein might be removed and re-incorporated in the frozen product whereby the desired nutritional value in the latter will be present while the "sandy" characteristic will be eliminated, but in accordance with the present invention it is preferred that the casein remain unaffected so as to retain as high a percentage of albumen and normal salts of milk in the final product as is possible. For this reason it is proposed, in the present case, to prevent the formation of crystallized milk sugar by eliminating a sufficient quantity thereof so as to attain the volume of milk sugar at or below the point where the same would cause supersaturation of the mixture. In other words, by eliminating milk sugar to an extent where the water content of the mixture will not be supersaturated at a given temperature there can be no precipitation of the milk sugar in the form of crystals such as would impart to the final product the undesirable "sandy" characteristic.

In its broadest aspect, therefore, the present invention consists in the elimination of the lactose or milk sugar to a point where it cannot be converted into crystals and while this may be accomplished in other ways it is preferred that such elimination be secured by the use of lactase. By treating the lactose or milk sugar with the lactase, the former is broken down, hydrolyzed and inverted into other substances which are readily soluble in the water contained in the mixture to be frozen and as a result there will be no precipitation of lactose in the form of crystals. While the lactose is thus eliminated, or partially eliminated, the percentage of milk sugar proper in the final product is consequently limited the final product will still have incorporated therein percentages of milk-solids-not-fat, such as casein and albumen as will impart to the final product the desirable nutritional value. On the other hand, the final product will not possess the undesirable "sandy" characteristic heretofore mentioned, but will have an exceedingly fine or smooth consistency.

In the production of ice cream at the present time the quantity of milk-solids-not-fat, used in the mixture has been limited to prevent the formation of crystallized milk sugar as has heretofore been mentioned and this limitation has resulted in also limiting the quantity of proteins and casein in the final product, ice cream of smooth consistency produced by former methods seldom, if ever, possessing more than 4.96% proteins and 4.2% casein. With the use of the present invention, however, the quantity of these substances is not limited, it being entirely feasible to produce ice cream having more than 4.96% proteins and 4.2% casein. Likewise, the present invention permits the use of more than 12% milk-solids-not-fat, whereas, ice cream producers have heretofore not only employed gelatine, as before pointed out, but have always limited the quantity of milk-solids-not-fat, to a point below 12%. In other words, substantially all of the substances which serve to increase the nutritional value of the final product may be used in practically any desired quantities, except the milk sugar and, as before mentioned, this substance should be maintained at a point where supersaturation of the water content at the temperature of the frozen product will not take place.

Referring more specifically to the procedure contemplated, the necessary enzyme is prepared from Kafir grains; however, in some instances from almonds. Where Kafir grains are used, the enzyme is separated in the following manner. The Kafir grains are dried and ground with pulverized glass, then soaked in cold water for a period of twenty-four hours and then the entire mass is filtered and the filtrate concentrated and the concentrate added to the skim milk. The temperature of the skim milk is then raised to approximately 158° F. and this temperature maintained until desired amount of hydrolyzation has taken place.

Under usual circumstances where approximately 16% milk-solids-not-fat are desired in the ice cream it is desirable to hydrolyze 30% of the lactose. It is desirable to use an enzyme concentration which will bring about the amount of hydrolyzation in approximately two to three hours time. The ratio or proportion of enzyme concentrate used will, of course, vary as there has been, to date, no standardization of the enzyme. In view of this it will be necessary to make successive tests of the mixture as the concentrate is added to determine when hydrolyzation has taken place to the desired extent. Such tests may be made, for example, by either volumetric or gravimetric methods for determining the degree of hydrolyzation which has taken place. Similar determinations may be made by means of a polarimeter.

After this, the skim milk is concentrated in vacuo to the usual degree called for in evaporated skim milk for the ice cream mix. This product in which a considerable portion of the milk sugar has been converted into other compounds is used in the manufacture of the frozen food product exactly in the same way as evaporated skim milk is used, excepting on account of the lactose being partially eliminated larger percentages of the skim milk solids may be used without the formation of the very objectionable milk sugar crystals.

What I claim is:

1. A step in the process of producing a frozen food product, such as ice cream, from a mixture containing milk solids, including milk sugar, which consists in converting the milk sugar into substances substantially soluble in the water content of the mixture at the temperature of the frozen product.

2. The process of producing a food such as ice cream from a mixture containing milk-solids-not-fat containing milk sugar which consists in adding to the skim milk a lactose inverting enzyme, heating the milk to a temperature sufficiently high to hydrolyze a portion of the milk sugar, concentrating the resulting product and finally reducing it to a frozen condition.

3. The process of producing a food product from a mixture containing milk solids, not fat, including milk sugar, which consists in adding to the skim milk a lactose inverting enzyme, heating the milk to a temperature sufficiently high to hydrolyze a portion of the milk sugar, and concentrating the resulting product.

4. The process of producing a food product from a mixture containing milk solids, not fat, including milk sugar, which consists in converting the milk sugar into substances more soluble in water than milk sugar, and concentrating the resulting product.

5. A step in the process of producing a frozen food product, such as ice cream, of smooth consistency from a mixture containing milk solids, including milk sugar, which consists in preventing supersaturation of the water content of the mixture by the milk sugar by converting a portion of said sugar into substances substantially soluble in water, the casein in the mixture being substantially unchanged.

6. A frozen food product such as ice cream or the like of smooth consistency and containing milk solids not fat and milk sugar derivatives.

GROVER D. TURNBOW.